US012777401B2

(12) United States Patent
Yang et al.

(10) Patent No.: US 12,777,401 B2
(45) Date of Patent: Oct. 27, 2026

(54) EARLY DATA FORWARDING CONDITIONAL HANDOVER CONFIGURATIONS

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 18/827,086

(22) Filed: Sep. 6, 2024

(65) Prior Publication Data

US 2026/0075493 A1 Mar. 12, 2026

(51) Int. Cl.

| | |
|---|---|
| ***H04W 36/36*** | (2009.01) |
| ***H04W 36/08*** | (2009.01) |
| ***H04W 36/30*** | (2009.01) |

(52) U.S. Cl.

CPC ......... *H04W 36/362* (2023.05); *H04W 36/08* (2013.01); *H04W 36/30* (2013.01)

(58) Field of Classification Search

CPC .... H04W 36/362; H04W 36/08; H04W 36/30

See application file for complete search history.

(56) References Cited

U.S. PATENT DOCUMENTS

2021/0385703 A1* 12/2021 Park .................. H04W 36/0061

* cited by examiner

*Primary Examiner* — Curtis B Odom

(74) *Attorney, Agent, or Firm* — Holland & Hart LLP

(57) ABSTRACT

Methods, systems, and devices for wireless communications are described. A user equipment (UE) may transmit a capability message indicative of a capability of the UE to perform a target cell selection based on an early data forwarding indication. The UE may transmit a message requesting parameters associated with the conditional handover procedure. The UE may receive a control message indicating an enhanced conditional handover configuration associated with the conditional handover procedure based on the capability message. The enhanced conditional handover configuration may include an indication of one or more candidate cells for which early data forwarding to a target cell prior to the completion of the conditional handover procedure is supported. The UE may perform target cell selection for the conditional handover procedure in accordance with the enhanced conditional handover configuration and based on satisfaction of at least one trigger condition.

20 Claims, 11 Drawing Sheets

EARLY DATA FORWARDING CONDITIONAL HANDOVER CONFIGURATIONS

FIELD OF TECHNOLOGY

The following relates to wireless communications, including early data forwarding conditional handover configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include transmitting a capability message indicative of a capability of the UE to perform a target cell selection prior to completion of a conditional handover procedure based on an early data forwarding indication, transmitting a message requesting one or more parameters associated with the conditional handover procedure, the one or more parameters including a handover type, whether conditional handover involves a random access channel (RACH) procedure, an early data forwarding status, a network energy saving (NES) status, a NES mode, or any combination thereof, receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported, and performing target cell selection for the conditional handover procedure in accordance with the enhanced conditional handover configuration and based on satisfaction of at least one trigger condition associated with the conditional handover procedure and one or more of a Quality of Service (QoS) threshold of an application, a predicted traffic burst time interval, a traffic volume, a machine learning (ML) model of the UE.

A UE for wireless communications is described. The UE may include one or more memories storing processor executable code, and one or more processors coupled with the one or more memories. The one or more processors may individually or collectively be operable to execute the code to cause the UE to transmit a capability message indicative of a capability of the UE to perform a target cell selection prior to completion of a conditional handover procedure based on an early data forwarding indication, transmit a message requesting one or more parameters associated with the conditional handover procedure, the one or more parameters including a handover type, whether conditional handover involves a RACH procedure, an early data forwarding status, NES status, a NES mode, or any combination thereof, receive a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported, and perform target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, an ML model of the UE.

Another UE for wireless communications is described. The UE may include means for transmitting a capability message indicative of a capability of the UE to perform a target cell selection prior to completion of a conditional handover procedure based on an early data forwarding indication, means for transmitting a message requesting one or more parameters associated with the conditional handover procedure, the one or more parameters including a handover type, whether conditional handover involves a RACH procedure, an early data forwarding status, a NES status, a NES mode, or any combination thereof, means for receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported, and means for performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, an ML model of the UE.

A non-transitory computer-readable medium storing code for wireless communications is described. The code may include instructions executable by one or more processors to transmit a capability message indicative of a capability of the UE to perform a target cell selection prior to completion of a conditional handover procedure based on an early data forwarding indication, transmit a message requesting one or more parameters associated with the conditional handover procedure, the one or more parameters including a handover type, whether conditional handover involves a RACH procedure, an early data forwarding status, an NES status, a NES mode, or any combination thereof, receive a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported, and perform target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE.

Some examples of the method, UEs, and non-transitory computer-readable medium described herein may further include operations, features, means, or instructions for detecting satisfaction of a set of multiple trigger conditions associated with the conditional handover procedure, each trigger condition of the set of multiple trigger conditions corresponding to a respective candidate cell of a set of multiple candidate cells of the enhanced conditional handover configuration and selecting, in response to detecting the satisfaction of the set of multiple trigger conditions, the target cell from the set of multiple candidate cells based on whether the early data forwarding to the target cell prior to the completion of the conditional handover procedure may be supported, priority levels of the set of multiple candidate cells, radio frequency conditions, intra-node handover, inter-node handover, intra-distributed unit (DU) handover, inter-DU handover, intra-centralized unit (CU) handover, inter-CU handover, or any combination thereof with or without the early data forwarding, or any combination thereof.

In some examples of the method, UEs, and non-transitory computer-readable medium described herein, the one or more parameters further include the predicted traffic burst time interval, a predicted traffic burst volume, or both and the NES status may be based on the QoS threshold of the application.

In some examples of the method, UEs, and non-transitory computer-readable medium described herein, performing the conditional handover procedure may include operations, features, means, or instructions for receiving, during the conditional handover procedure, one or more downlink messages.

Some examples of the method, UEs, and non-transitory computer-readable medium described herein may further include operations, features, means, or instructions for transmitting one or more messages requesting support of the early data forwarding prior to the completion of the conditional handover procedure for one or more second candidate cells, a network energy savings mode, or both, where the enhanced conditional handover configuration may be based on the one or more messages.

In some examples of the method, UEs, and non-transitory computer-readable medium described herein, the one or more candidate cells for which the early data forwarding to the target cell prior to the completion of the conditional handover procedure may be supported may be associated with a higher priority level than one or more second candidate cells of the enhanced conditional handover configuration.

In some examples of the method, UEs, and non-transitory computer-readable medium described herein, the enhanced conditional handover configuration further includes an indication of a time window during which the early data forwarding may be performed for the one or more candidate cells.

In some examples of the method, UEs, and non-transitory computer-readable medium described herein, the enhanced conditional handover configuration further includes the NES mode of cell discontinuous transmission (DTX), cell discontinuous reception (DRX), or both, a spatial adaptation, a power adaptation, or any combination thereof at one or more second cells.

In some examples of the method, UEs, and non-transitory computer-readable medium described herein, the enhanced conditional handover configuration includes a radio resource control (RRC) reconfiguration.

In some examples of the method, UEs, and non-transitory computer-readable medium described herein, the enhanced conditional handover configuration may be applicable to one or more different handover types, whether the conditional handover involves the RACH procedure, early data forwarding statuses, NES modes, or any combination thereof.

In some examples of the method, UEs, and non-transitory computer-readable medium described herein, the enhanced conditional handover configuration further includes an indication of intra-node handover, inter-node handover, intra-DU handover, inter-DU handover, intra-CU handover, inter-CU handover, or any combination thereof with or without the early data forwarding.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Some wireless communications devices may perform conditional handover. For example, a network entity may configure a user equipment (UE) with multiple candidate cells and one or more associated handover conditions, where the UE may autonomously perform handover to one of the multiple candidate cells. That is, the UE may perform the handover without transmitting an indication to the network entity, without receiving a handover command, or both. In some cases, the UE may perform the handover autonomously in cases in which a link quantity of the source cell is low and the UE may not be able to successfully transmit handover requests or receive handover commands. The UE may monitor for one or more handover conditions to be met or satisfied and execute the conditional handover based on satisfaction of at least one handover condition. The conditional handover may involve the UE halting communications with the source cell, performing downlink and uplink synchronization for the target cell, and transmitting a handover complete message to a network entity supporting the source cell or target cell. However, during the conditional handover, the UE may not receive data from the source cell, the target cell, or both.

The network entity may include, in a conditional handover configuration, an indication of one or more candidate cells for which early data forwarding is available and may transmit an indication of the conditional handover configuration to a UE. That is, for one or more of the candidate cells, the UE may reduce an amount of time that data may be lost by performing early data forwarding in accordance with the conditional handover configuration. The candidate cells for which early data forwarding is available may be cells with higher probabilities of handover, higher priority levels for the UE, or both relative to other cells. In some examples, the UE may indicate a capability to perform conditional handover with the early data forwarding, request one or more parameters associated with the conditional handover configuration, or both. The UE may monitor for handover conditions and perform conditional handover based on satisfaction of a condition for conditional handover for a candidate cell. In examples in which the target cell is associated with early data forwarding, the UE may receive data prior to completion of the handover. That is, the UE may receive data from the target cell prior to transmission of a handover complete message.

Aspects of the disclosure are initially described in the context of wireless communications systems. Aspects of the disclosure are also described in the context of timing diagrams and process flows. Aspects of the disclosure are further illustrated by and described with reference to apparatus diagrams, system diagrams, and flowcharts that relate to early data forwarding conditional handover configurations.

Figure 1:
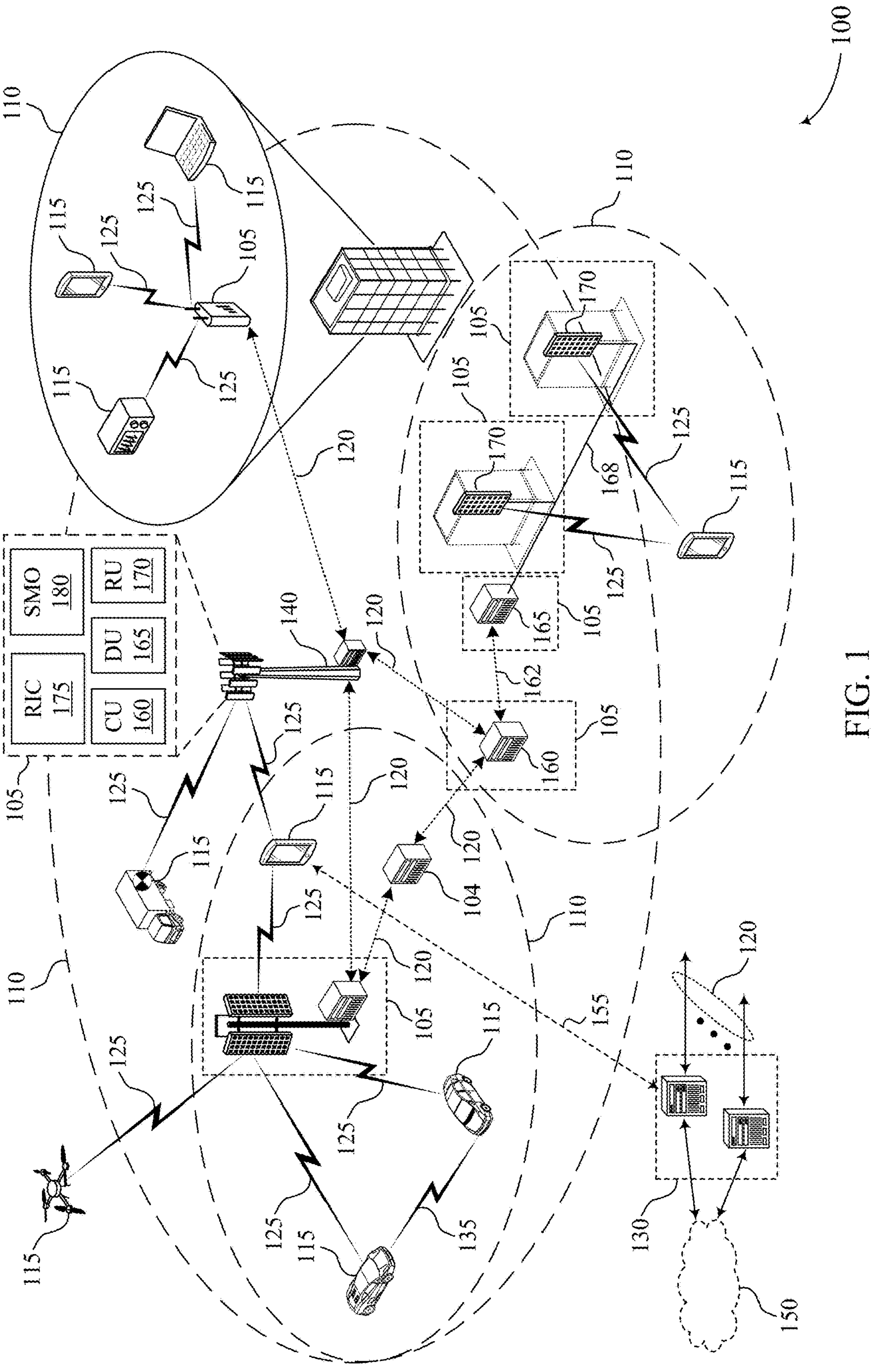
FIG. 1 shows an example of a wireless communications system that supports early data forwarding conditional handover configurations in accordance with one or more aspects of the present disclosure.

FIG. 1 shows an example of a wireless communications system 100 that supports early data forwarding conditional handover configurations in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node (s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support early data forwarding conditional handover configurations as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link (s) 125 (e.g., one or more access links) using resources associated with one or more carriers. The term "carrier" may refer to a set of RF spectrum resources having a defined PHY layer structure for supporting the communication link (s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support a conditional handover. Conditional handover may involve configuration of a UE 115 with a threshold for triggering transmission of a measurement report and such a threshold may be lower (e.g., have a lower target or condition to satisfy) relative to other types of handover. For example, the UE 115 may transmit a measurement report to the network entity 105 (e.g., a source network entity). The network entity 105 may perform target handover preparation with one or more candidate target cells (e.g., up to 8 cells). The network entity 105 may output a control signal indicating a conditional handover configuration. For example, the network entity 105 may output an RRC reconfiguration message including one or more conditional handover execution conditions and one or more conditional handover candidate cells (e.g., in an RRC container). In some examples, the UE 115 may verify the conditional handover configuration. For example, the UE 115 may check a validity of the conditional handover configuration after receiving the control signal. The UE 115 may transmit a response message to the control signal based on verifying the conditional handover configuration. For example, the UE 115 may transmit an RRC reconfiguration complete message.

The UE 115 may evaluate conditional handover execution conditions for the candidate target cells based on the conditional handover configuration. That is, the UE 115 may monitor for satisfaction of a conditional handover execution condition for at least one of the candidate target cells. After detecting a conditional handover execution condition, the UE 115 may perform synchronization and a random access channel (RACH) procedure to a target candidate cell for which the conditional handover execution condition was met. In other words, the UE 115 may connect to a target network entity based on satisfaction of a conditional handover execution condition for the target network entity, where connecting to the target network entity may include performance of synchronization, RACH, or both on the target cell. In some examples, the UE 115 may check a validity of a target configuration (e.g., an RRC configuration for the target cell) after connecting to the target network entity. After the UE 115 connects to the target network entity, the target network entity may exchange one or more messages with the source network entity (e.g., the network entity 105) indicating that the handover is complete and releasing a context of the UE 115 at the source network entity.

Conditional handover may improve handover performance by addressing one or more scenarios in which the UE 115 is unable to communicate with the source network entity. In a first example, the UE 115 may be unable to find a target cell after receiving a handover command (e.g., an RRC reconfiguration message). In such examples, the UE 115 may experience radio link failure (RLF) and establish or reestablish a connection with another cell. However, in examples in which the UE 115 performs conditional handover, the conditional handover configuration may include more than one candidate cell such that the UE 115 may connect to another candidate cell in examples in which a first candidate cell is unavailable. Thus, at least in some scenarios, conditional handover may increase a handover success rate.

In a second example, the UE 115 may experience poor radio frequency conditions such that the network entity 105 may fail to receive a measurement report. Additionally, or alternatively, the UE 115 may experience poor downlink radio frequency conditions such that the UE 115 fails to receive a handover command. Failure of the network entity 105 to receive the measurement report or failure of the UE 115 to receive the handover command may result in RLF and reestablishment of a connection with a target cell. In examples in which the UE 115 performs conditional handover, the conditional handover configuration may include relatively relaxed or lower handover thresholds relative to other handover types. In such examples, handover to the target cell may be triggered earlier, resulting in earlier transmission of the measurement report to the network entity 105. Earlier transmission of the measurement report may be associated with a greater success rate, as the radio frequency conditions may be better.

Conditional handover may refer to a handover in which a UE 115 autonomously performs handover without communicating with a source cell based on conditional handover conditions. When the UE 115 performs the conditional handover, the UE 115 may stop transmitting or receiving signals to or from the source cell. However, the source cell may be unaware of the handover (e.g., due to the lack of signaling) and continue to schedule uplink or downlink data to the UE 115. Additionally, the source cell may be unaware of a target cell selected by the UE 115 for the conditional handover and, thus, unable to perform early data forwarding to reduce data interruption during the handover procedure. Static resource reservation at candidate cells may degrade a network capacity, which may be further degraded in examples in which multiple candidate cells are configured for conditional handover. That is, early data forwarding with multiple candidate cells may degrade the network capacity and be associated with a large data forwarding load towards all candidate cells (e.g., large, unnecessary overhead). Additionally, UE-based mobility execution for conditional handover may be associated with a higher probability of a race condition with the network entity 105 (e.g., both RAN and core network triggered procedures).

To support the conditional handover procedure, the conditional handover configuration may include one or more candidate cells for which early data forwarding is enabled (e.g., rather than all configured candidate cells). The network entity 105 may include, in the conditional handover configuration, an indication of one or more candidate cells for which early data forwarding is available. That is, for one or more of the candidate cells, the UE 115 may reduce an amount of time that data may be lost by performing early data forwarding. The candidate cells for which early data forwarding is available may be cells with higher probabilities of handover, higher priority levels for the UE 115, or both relative to other cells. In some examples, the UE 115 may indicate a capability to perform conditional handover with the early data forwarding, request one or more parameters associated with the conditional handover configuration, or both. The UE 115 may monitor for handover conditions and perform conditional handover based on satisfaction of a condition for conditional handover for a candidate cell. In examples in which the target cell is associated with early data forwarding, the UE 115 may receive data prior to completion of the handover.

Figure 2:
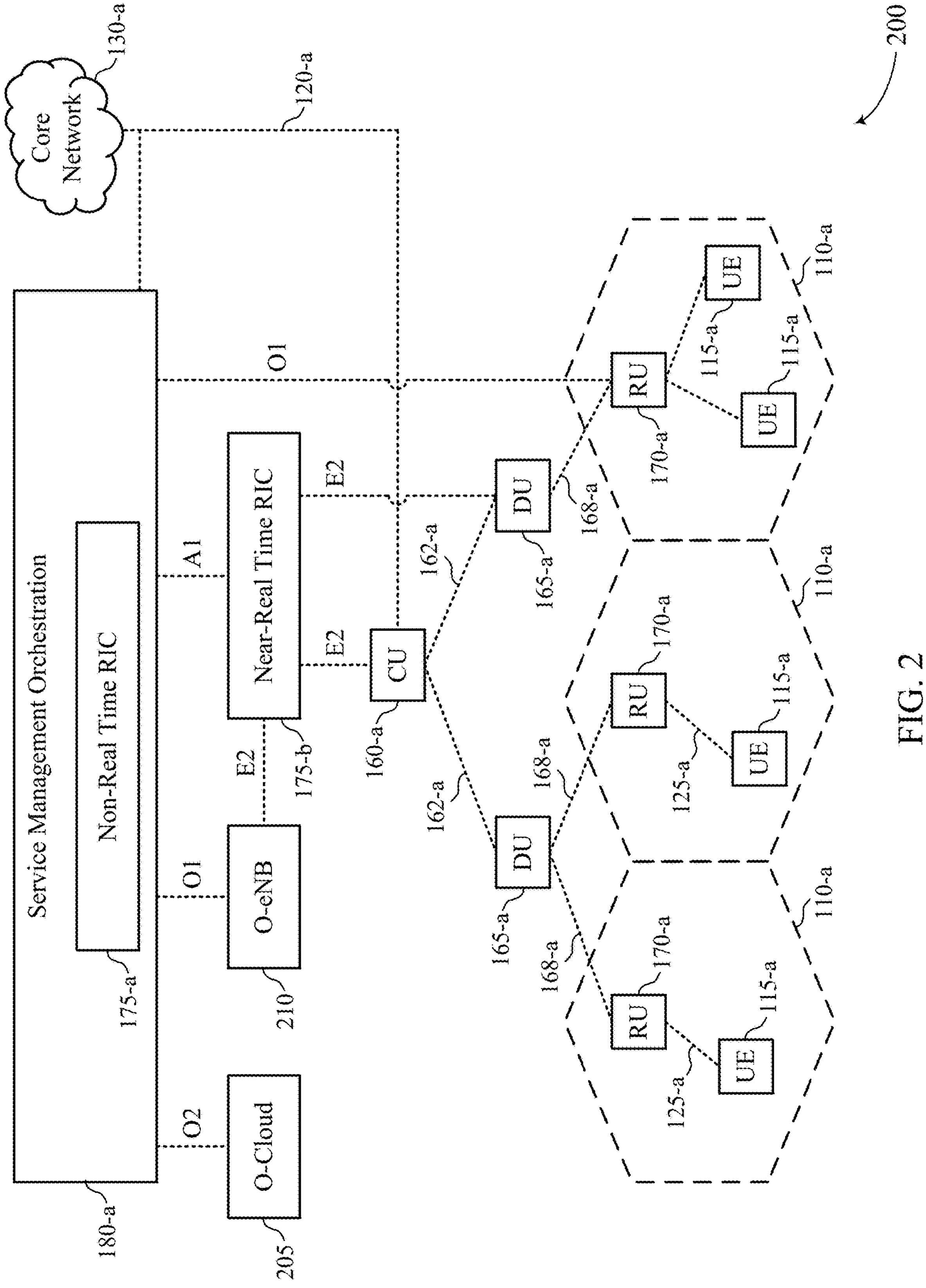
FIG. 2 shows an example of a network architecture that supports early data forwarding conditional handover configurations in accordance with one or more aspects of the present disclosure.

FIG. 2 shows an example of a network architecture 200 (e.g., a disaggregated base station architecture, a disaggregated RAN architecture) that supports early data forwarding conditional handover configurations in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
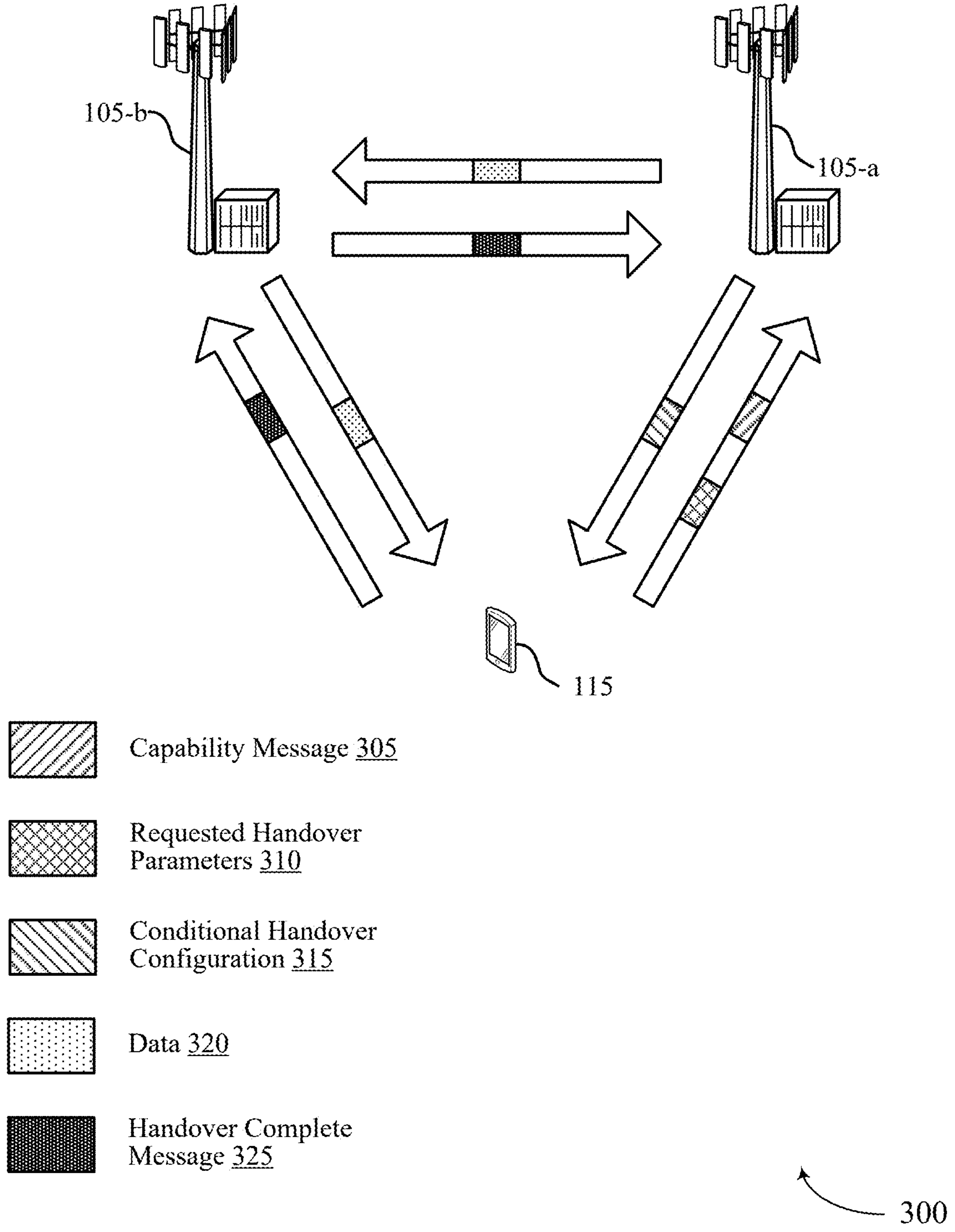
FIG. 3 shows an example of a wireless communications system that supports early data forwarding conditional handover configurations in accordance with one or more aspects of the present disclosure.

FIG. 3 shows an example of a wireless communications system 300 that supports early data forwarding conditional handover configurations in accordance with one or more aspects of the present disclosure. The wireless communications system 300 may implement or be implemented by various aspects of the wireless communications system 100, the network architecture 200, or both. For example, the wireless communications system 300 may include a network entity 105-*a*, a network entity 105-*b*, and a UE 115, which may represent examples of corresponding devices as described with reference to FIG. 1.

In the example of FIG. 3, the UE 115 may perform a conditional handover from a source cell (e.g., the network entity 105-*a*) to a target cell (e.g., the network entity 105-*b*). The network entity 105-*b* may be of multiple candidate cells (not shown). The UE 115 may communicate with the network entity 105-*a*, the network entity 105-*b* or both via uplink and downlink communications links. Additionally, the network entity 105-*a* may communicate with the network entity 105-*b* via a backhaul link. The uplink, downlink, and backhaul communications links may be examples of the communications links 125 as described with reference to FIG. 1. The conditional handover may involve the UE 115 connecting to the network entity 105-*b* and disconnecting from the network entity 105-*a* absent of signaling with the network entity 105-*a* and based on a conditional handover condition being met.

The UE 115 may transmit a capability message 305 to the network entity 105-*a* indicating a capability of the UE 115 to support the conditional handover. The capability of the UE 115 to support the conditional handover may refer to a capability of the UE 115 to support the conditional handover according to a conditional handover enhancement or to support an enhanced conditional handover. For example, the enhanced conditional handover may include, at least, early data forwarding for a subset of a set of candidate cells. As used herein, a set may refer to one or more, whereas a subset may refer to a quantity (e.g., a nonzero quantity) less than the one or more of the set. That is, the enhanced conditional handover may include early data forwarding for an amount of candidate cells that is less than a total quantity of candidate cells. Additionally, or alternatively, an enhanced conditional handover configuration may include a network energy savings (NES) mode of the candidate cells, including a cell discontinuous transmission (DTX) or discontinuous reception (DRX) cycle length, spatial adaptation, power adaptation, an intra or inter-node indication, or any combination thereof.

In some examples, the UE 115 may indicate requested handover parameters 310. For example, the UE 115 may transmit one or more messages to the network entity 105-*a* indicative of a requested handover type, a requested target cell for which early data forwarding is configured, a requested NES mode, or any combination thereof. The handover type may include, as examples, a Layer 3 (L3), Layer 1 (L1), or sequence conditional handover or lower-layer triggered mobility; RACH-less or RACH based; or early or late RACH. In other words, the UE 115 may indicate one or more requested parameters related to a handover type. In some instances, the UE 115 may indicate a requested target cell for early data forwarding. For example, the UE 115 may request that the network entity 105-*a* support early data forwarding for the network entity 105-*b*. The requested handover parameters 310 may be referred to interchangeably as "preferred" handover parameters.

The network entity 105-*a* may determine a conditional handover configuration 315 based on the capability message 305, the requested handover parameters 310, or both. For example, the network entity 105-*a* may identify one or more target cells for which early data forwarding is configured, the NES mode of the candidate cells, a time window, or any combination thereof. The network entity 105-*a* may determine the conditional handover configuration 315 based on historical data (e.g., of the UE 115, the candidate cells, or both), using an AI or ML model at the network entity 105-*a*, in accordance with a 5G Quality of Service (QoS) identifier (5QI) or application, or any combination thereof.

The network entity 105-*a* may output a control message including the conditional handover configuration 315. For example, the network entity 105 may output an RRC message (e.g., an RRC reconfiguration message) including the conditional handover configuration 315. The conditional handover configuration 315 may be an example of an L3 or L1 conditional handover configuration or a sequence L3 or Layer 2 (L2) conditional handover configuration with one conditional handover configuration (e.g., multiple conditional handovers with one conditional handover configuration). The conditional handover configuration 315 may include early data forwarding for a subset of candidate cells (e.g., less than a total set of candidate cells), an indication of a NES mode of the candidate cells, a time window, triggering conditions for the conditional handover, or any combination thereof. For example, the conditional handover configuration 315 may indicate that early data forwarding is supported for one or more first cells of a set of candidate cells, where data forwarding is absent (e.g., not supported) for one or more second cells (e.g., the remaining cells in the set of candidate cells) different than the one or more first cells.

The NES mode in the conditional handover configuration 315 may indicate whether respective candidate cells include a DTX or DRX cycle, spatial adaptation, power adaptation, an intra or inter-network entity indication, or any combination thereof. A DTX or DRX cycle may refer to cell DTX or DRX, which may be configured, activated, and deactivated via RRC or a group-common downlink control information (DCI) message (e.g., a DCI having a format 2-9). During a non-active time of a cell DTX or DRX, one or more signals may not be transmitted or received. For example, during a non-active time of a cell DTX or DRX, one or more downlink transmissions, such as a semi-persistently scheduled (SPS) transmission, a UE-specific search space (USS) physical downlink control channel (PDCCH), a PDCCH with a DCI format of 2_X (e.g., X=0, 1, . . . , 5), periodic or semi-periodic channel state information (CSI)-reference signals (RSs) for CSI reports, or any combination thereof, may not be transmitted or received. Additionally, or alternatively, during the non-active time of the cell DTX or DRX, one or more uplink transmissions, such as configured grants (CGs), scheduling requests (SRs), periodic or semi-periodic SPS (e.g., except SPS for positioning), periodic or semi-periodic CSI reports, or any combination thereof, may not be transmitted or received.

A spatial adaptation may refer to an adaptation of spatial elements. The adaptation may be at a logical port level or a physical antenna level. For example, a set of antenna elements (e.g., all antenna elements) associated to a logical antenna port may be disabled or enabled. Alternatively, a subset of antenna elements (e.g., fewer than the total quantity of antenna elements) associated to a logical antenna port may be disabled or enabled. In some examples, a channel state feedback (CSF) framework may enable UE feedback for multiple CSIs associated with multiple spatial element configurations in a single CSI report.

A power adaptation may refer to an adaptation of a physical downlink shared channel (PDSCH) transmission power. The power adaptation may enable a network entity to efficiently adapt the PDSCH transmission power with UE assistance. In some examples, a CSI framework may enable UE feedback for multiple CSIs associated with multiple PDSCH or CSI-RS power offsets in a single CSI report. A CSI reporting configuration may include more than one (e.g., $L>1$) CSI report sub-configurations associated with different hypotheses for a spatial domain, a power domain, or both. The sub-configuration may include content defining adaptation types, including Type 1 spatial domain, Type 2 spatial domain, or power domain. The UE 115 may report CSIs associated with N CSI report sub-configurations in one CSI report. In examples in which the UE 115 reports CSI periodically, the UE 115 may include L sub-configurations. Alternatively, in examples in which the UE 115 reports CSI semi-periodically or aperiodically, the UE 115 may receive an indication of N sub-configurations (where $1 \leq N \leq L$) via a MAC-control element (CE) for semi-periodic CSI reporting on a physical uplink control channel (PUCCH) or via a DCI (e.g., using a triggering state) for semi-periodic CSI reporting on a physical uplink shared channel (PUSCH) and aperiodic CSI reporting.

The inter or intra network entity indication may refer to handover between a network entity, a CU, a DU, or the like. For example, the inter or intra network entity indication may indicate whether the handover is within a node or between different nodes. In other words, the inter or intra network entity indication may indicate whether data forwarding is to be performed based on whether the nodes involved in the handover are within a same network entity (e.g., intra-network entity) or between different network entities (e.g., inter-network entity). Data forwarding (e.g., early, late, or both) may be performed in examples in which the handover is inter-network entity, while data forwarding may not be performed in examples in which the handover is intra-network entity.

The time window may be indicative of a time window during which the early data forwarding is performed. For example, the conditional handover configuration 315 may indicate that, after a first duration (e.g., a delay), the network entity 105-*a* will perform early data forwarding for a second duration (e.g., occurring after the first duration) to one or more candidate cells for which the early data forwarding is supported. That is, the network entity 105-*a* may perform the early data forwarding for the one or more candidate cells without receiving signaling from the UE 115 after a delay from transmission of the conditional handover configuration 315 and for a duration. The time window may be the same or different for the one or more candidate cells.

The UE 115 may monitor for the trigger conditions. For example, the UE 115 may determine whether a trigger condition for the conditional handover is met or satisfied. The trigger conditions may be associated with different candidate cells. That is, each candidate cell may be associated with a respective trigger condition. In some examples, the UE 115 may detect occurrence of a trigger condition. In examples in which the UE 115 detects the trigger condition (e.g., a single trigger condition), the UE 115 may perform conditional handover to the candidate cell associated with the trigger condition. Alternatively, in examples in which the UE 115 detects multiple trigger conditions, the UE 115 may perform target cell selection. That is, the UE 115 may select, from one or more cells having trigger conditions that are satisfied, a target cell for the conditional handover procedure.

The UE 115 may select the target cell based on the conditional handover configuration 315. For example, the UE 115 may select the target cell based on whether early data forwarding is supported, the NES mode, the time window, or the like. As an example, the UE 115 may select the target cell having early data forwarding rather than a candidate cell absent of early data forwarding. Additionally, or alternatively, the UE 115 may select the target cell based on the time window. For example, if the early data forwarding is not yet started (e.g., the delay has not yet elapsed) or if the early data forwarding time window has elapsed, the UE 115 may select the target cell irrespective of whether early data forwarding is supported. In some examples, the UE 115 may select the target cell based on radio frequency conditions (e.g., an A3 event threshold, a time to trigger (TTT), or the like), QoS latency thresholds for one or more applications, the NES mode, or the like. The UE 115 may select the target cell via an AI or ML model at the UE 115. That is, the UE 115 may provide parameters associated with the candidate cells for which conditional handover is triggered as inputs to the AI or ML model and obtain, as an output, a selected target cell.

After transmitting the conditional handover configuration 315, the network entity 105-*a* may forward data 320 to the one or more candidate cells. For example, the network entity 105-*a* may forward the data 320 to the network entity 105-*b* (e.g., and one or more other candidate cells for which early data forwarding is available) for the indicated time window and via the backhaul link. In some examples, the network entity 105-*a* may forward the data 320 after a time delay and for a duration. That is, the time window may be defined by an initial delay after transmission of the conditional handover configuration 315 and a duration. The network entity 105-*b* may forward the data 320 to the UE 115 (e.g., after connecting with the UE 115).

The UE 115 may execute the conditional handover after detecting occurrence of one or more trigger conditions, selecting the target cell, or both. For example, the UE 115 may halt communications with the network entity 105-*a* (e.g., the source cell) and perform downlink synchronization and uplink synchronization (e.g., RACH). The UE 115 may transmit a handover complete message 325 in response to a random access response (RAR) message, and the network entity 105-*b* may transmit the handover complete message 325 to the network entity 105-*a*. That is, the target cell may indicate, to the source cell, that the UE 115 is handed over. After the network entity 105-*b* transmits the handover complete message 325 to the network entity 105-*a*, the network entity 105-*a* may perform late data forwarding.

The conditional handover configuration 315 may support network indication of different priority cells configured with early data forwarding, NES modes for multiple candidate cells, or both. The conditional handover configuration 315 may allow the UE 115 to select a candidate cell as a target candidate cell based on additional parameters compared to other conditional handover configurations, which may support improved performance associated with target cell selection in examples in which multiple candidate cells have similar radio frequency conditions. Additionally, the conditional handover configuration 315 and the conditional handover with early data forwarding may reduce conditional handover data interruption and overhead associated with early data forwarding to all candidate cells, among other benefits.

Figure 4:
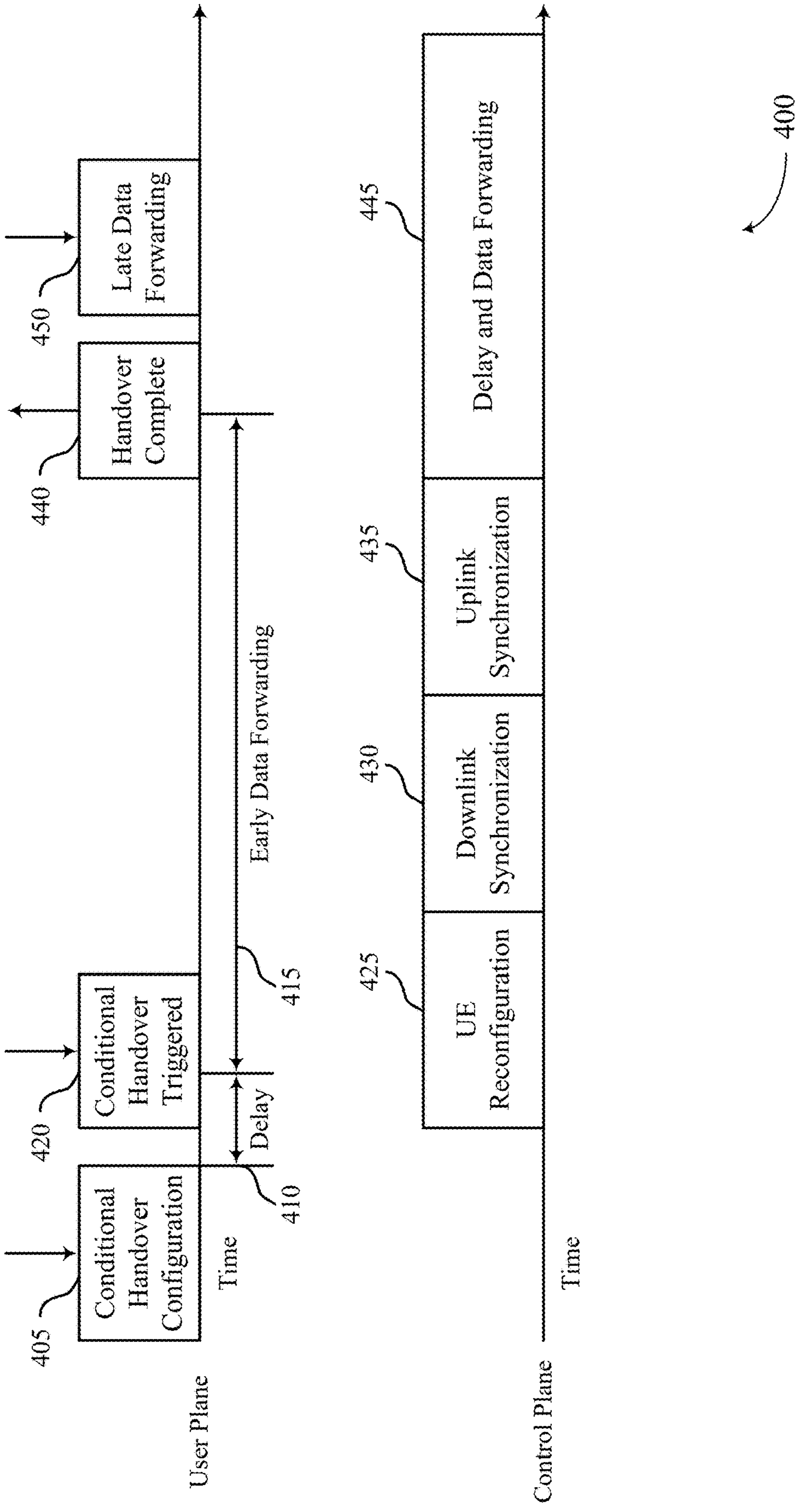
FIG. 4 shows an example of a timing diagram that supports early data forwarding conditional handover configurations in accordance with one or more aspects of the present disclosure.

FIG. 4 shows an example of a timing diagram 400 that supports early data forwarding conditional handover configurations in accordance with one or more aspects of the present disclosure. The timing diagram 400 may implement or be implemented by various aspects of the wireless communications system 100, the network architecture 200, the wireless communications system 300, or any combination thereof. For example, the timing diagram 400 may illustrate and describe communications between network entities and a UE, which may represent examples of corresponding devices as described with reference to FIGS. 1 and 3.

The timing diagram 400 may illustrate communications and performance of various operations on a user plane and a control plane. The timing diagram 400 may illustrate communication and operations at a UE, such as the UE 115 as described with reference to FIGS. 1 and 3. At 405, the UE may receive a conditional handover configuration. The conditional handover configuration may be an example of the conditional handover configuration 315 as described with reference to FIG. 3. The conditional handover configuration may indicate a time window for early data forwarding. The time window may include a delay 410 and a duration for which early data forwarding 415 is performed. That is, at any point during the duration for which early data forwarding 415 is performed, the UE may receive data from a source cell (e.g., the network entity 105-*a* as described with reference to FIG. 3) via a target cell.

At 420, conditional handover may be triggered. That is, the UE may detect a trigger condition for one or more candidate cells of the conditional handover configuration. The UE may select a target cell based on detecting trigger conditions for more than one candidate cell. After the conditional handover is triggered, the UE 115 may perform reconfiguration at 425. For example, the UE may connect to the target cell (e.g., the network entity 105-*b* as described with reference to FIG. 3). At 430, the UE and the target cell may perform downlink synchronization. For example, the UE may detect one or more downlink reference signals, such as synchronization signal blocks (SSBs) to synchronize to the target cell. At 435, the UE and the target cell may perform uplink synchronization. For example, the UE may perform a RACH procedure on the target cell. After the RACH procedure is complete, such as based on the UE receiving a RAR message from the target cell, the UE may transmit a handover complete message at 440. The handover complete message may indicate receipt of the RAR message.

At 445, after the uplink synchronization, there may be F1, E1, or Xn delay and data forwarding. For example, at 450, the source cell may perform late data forwarding (e.g., data forwarding after the handover is complete) to the UE.

Figure 5:
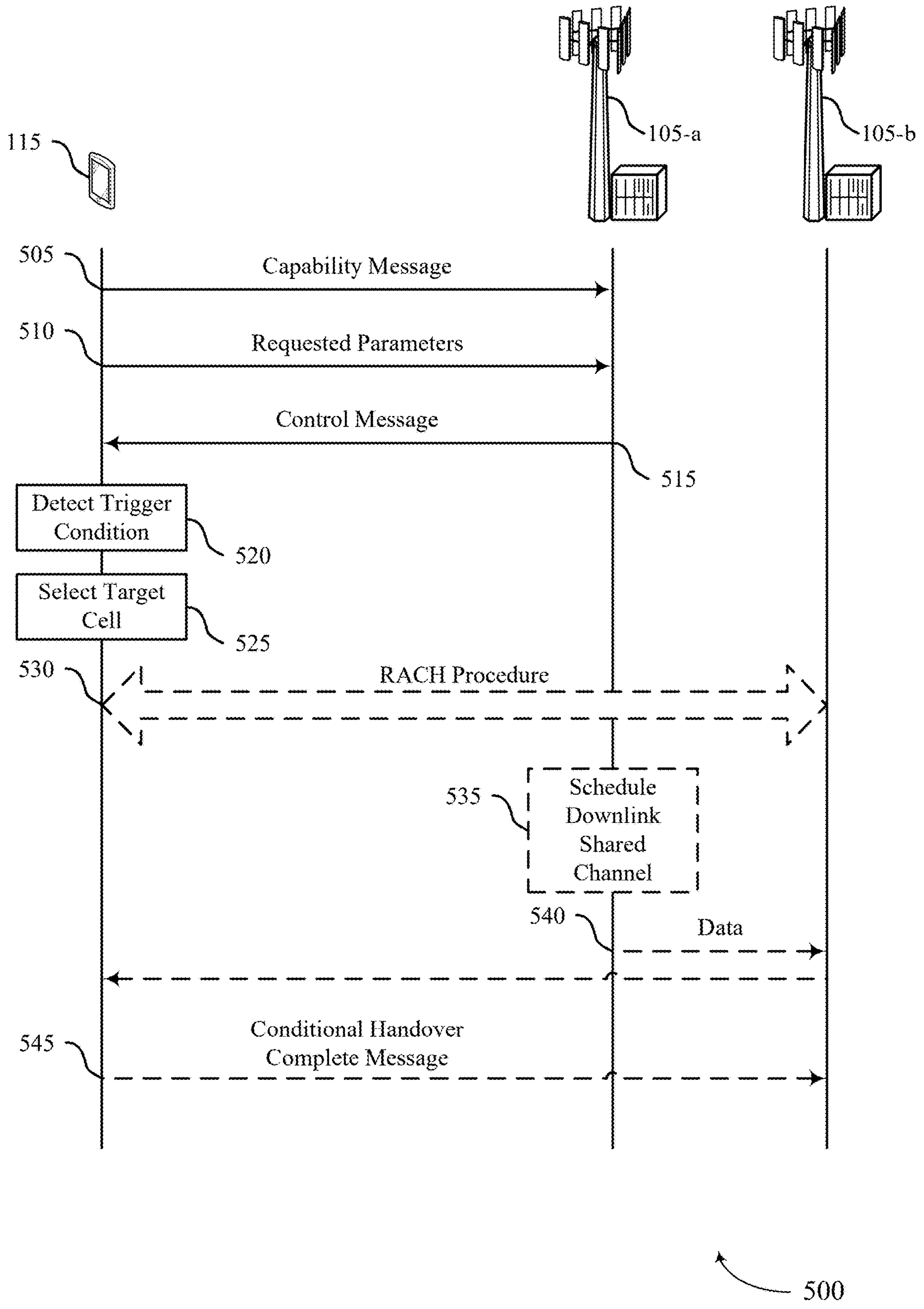
FIG. 5 shows an example of a process flow that supports early data forwarding conditional handover configurations in accordance with one or more aspects of the present disclosure.

FIG. 5 shows an example of a process flow 500 that supports early data forwarding conditional handover configurations in accordance with one or more aspects of the present disclosure. The process flow 500 may implement or be implemented by aspects of the wireless communications system 100, the network architecture 200, the wireless communications system 300, the timing diagram 400, or any combination thereof as described with reference to FIGS. 1 through 3. For example, the process flow 500 may include a network entity 105-*a*, a network entity 105-*b*, and a UE 115, which may be examples of corresponding devices as described with reference to FIGS. 1 and 3.

Alternative examples of the following may be implemented, where some operations are performed in a different order than described or are not performed at all. In some cases, operations may include additional features not mentioned below, or further operations may be added. Although the network entity 105-*a*, the network entity 105-*b*, and the UE 115 are shown performing the operations of the process flow 500, some aspects of some operations may also be performed by one or more other wireless devices.

At 505, the UE 115 may transmit a capability message to the network entity 105. For example, the UE 115 may transmit a capability message indicative of a capability of the UE 115 to perform a target cell selection based at least in part on an early data forwarding indication. That is, the capability message may indicate a capability of the UE 115 to perform target cell selection from one or more candidate cells in examples in which early data forwarding is available for one or more of the candidate cells. The capability message may be an example of the capability message 305 as described with reference to FIG. 3.

At 510, the UE 115 may transmit a request for one or more parameters. For example, the UE 115 may transmit a message requesting one or more parameters associated with the conditional handover procedure, the one or more parameters including a handover type, whether conditional handover involves a RACH procedure, an early data forwarding status, a NES status, a NES mode, or any combination thereof. In other words, the UE 115 may transmit one or more messages requesting support of the early data forwarding prior to the completion of the conditional handover procedure for one or more second candidate cells, a network energy savings mode, or both. The request for one or more parameters may be an example of the requested handover parameters 310 as described with reference to FIG. 3.

In some examples, the one or more parameters include the one or more parameters further comprise the predicted traffic burst time interval, a predicted traffic burst volume, or both. Additionally, or alternatively, the NES status may be based at least in part on a QoS threshold of an application.

At 515, the network entity 105-*a* may output a control message to the UE 115. For example, the UE 115 may receive a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. Additionally, the enhanced conditional handover configuration may be based on the one or more requested parameters. The enhanced conditional handover configuration may be an example of the conditional handover configuration 315 as described with reference to FIG. 3. Additionally, or alternatively, the control message may be an example of an RRC message, where the enhanced conditional handover configuration may be an example of an RRC reconfiguration.

In some examples, the one or more candidate cells for which the early data forwarding to the target cell prior to the completion of the conditional handover procedure is supported are associated with a higher priority level than one or more second candidate cells of the enhanced conditional handover configuration. That is, the cells configured with early data forwarding may be associated with a higher probability of being a target cell for the conditional handover relative to one or more other candidate cells.

The enhanced conditional handover configuration may include the enhanced conditional handover configuration an indication of a time window during which the early data forwarding is performed for the one or more candidate cells. For example, the time window may be defined by a delay after communication of the enhanced conditional handover configuration and a duration for which the early data forwarding is performed. The time window may be an example of the time window described with reference to FIG. 4.

In some examples, the enhanced conditional handover configuration may include an NES mode of DTX, DRX, or both, a spatial adaptation, a power adaptation, or any combination thereof at one or more second cells. Additionally, or alternatively, the enhanced conditional handover configuration may be applicable to one or more different handover types, whether conditional handover involves a RACH procedure, early data forwarding statuses, NES modes, or any combination thereof. The enhanced conditional handover configuration may include an indication of intra-node handover, inter-node handover, intra-DU handover, inter-DU handover, intra-CU handover, inter-CU handover, or any combination thereof with or without the early data forwarding.

At 520, the UE 115 may detect a trigger condition. For example, the UE 115 may detect satisfaction of one or more trigger conditions associated with the conditional handover procedure. Each trigger condition of the one or more trigger conditions may correspond to a respective candidate cell of multiple candidate cells of the enhanced conditional handover configuration.

At 525, the UE 115 may select a target cell. For example, the UE 115 may perform target cell selection for the conditional handover procedure in accordance with the enhanced conditional handover configuration and based on satisfaction of at least one trigger condition associated with the conditional handover procedure. The UE 115 may select the target cell based on one or more of a QoS threshold of an application, a predicted traffic burst time interval, a traffic volume, and a ML model of the UE 115.

The UE 115 may perform the target cell selection at 525 in examples in which the trigger condition is detected at 520 for more than one candidate cell. That is, the UE 115 may select, in response to detecting the satisfaction of the one or more trigger conditions at 525, the target cell from the one or more candidate cells based on whether the early data forwarding to the target cell prior to the completion of the conditional handover procedure is supported, priority levels of the plurality of candidate cells, radio frequency conditions, intra-node handover, inter-node handover, intra-DU handover, inter-DU handover, intra-CU handover, inter-CU handover, or any combination thereof.

At 530, the UE 115, the network entity 105-*b*, or both may perform a RACH procedure. For example, the UE 115 and the network entity 105-*b* may perform uplink synchronization, such as the uplink synchronization as described with reference to FIG. 4.

At 535, the network entity 105-*a* may schedule a downlink shared channel. For example, the network entity 105-*a* may continue to schedule the UE 115 with downlink messages after communicating the conditional handover configuration. At 540, the network entity 105-*b* may forward data from the network entity 105-*a* to the UE 115. For example, the UE 115 may receive, during the conditional handover procedure, one or more downlink messages from the source cell via the target cell.

At 545, the UE 115 may transmit a conditional handover complete message. That is, the UE 115 may indicate completion of the handover. The conditional handover complete message may be an example of the handover complete message 325 as described with reference to FIG. 3. After completion of the handover, the network entity 105-*a* may perform late data forwarding.

Figure 6:
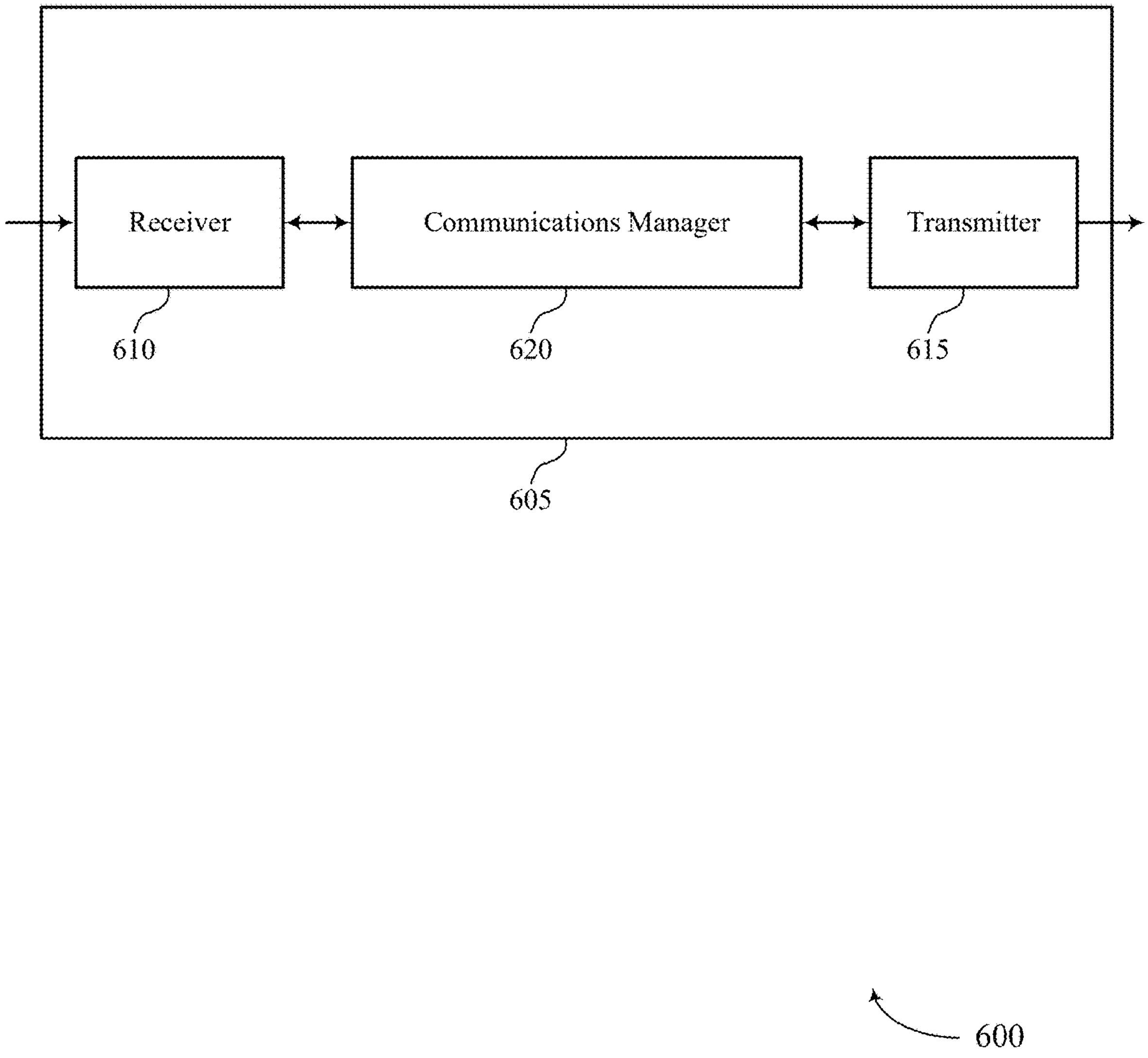
FIGS. 6 and 7 show block diagrams of devices that support early data forwarding conditional handover configurations in accordance with one or more aspects of the present disclosure.

FIG. 6 shows a block diagram 600 of a device 605 that supports early data forwarding conditional handover configurations in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to early data forwarding conditional handover configurations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to early data forwarding conditional handover configurations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of early data forwarding conditional handover configurations as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for transmitting a capability message indicative of a capability of the UE to perform a target cell selection based on an early data forwarding indication. The communications manager 620 is capable of, configured to, or operable to support a means for transmitting a message requesting one or more parameters associated with the conditional handover procedure, the one or more parameters including a handover type, whether conditional handover involves a RACH procedure, an early data forwarding status, a NES status, a NES mode, or any combination thereof. The communications manager 620 is capable of, configured to, or operable to support a means for receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The communications manager 620 is capable of, configured to, or operable to support a means for performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
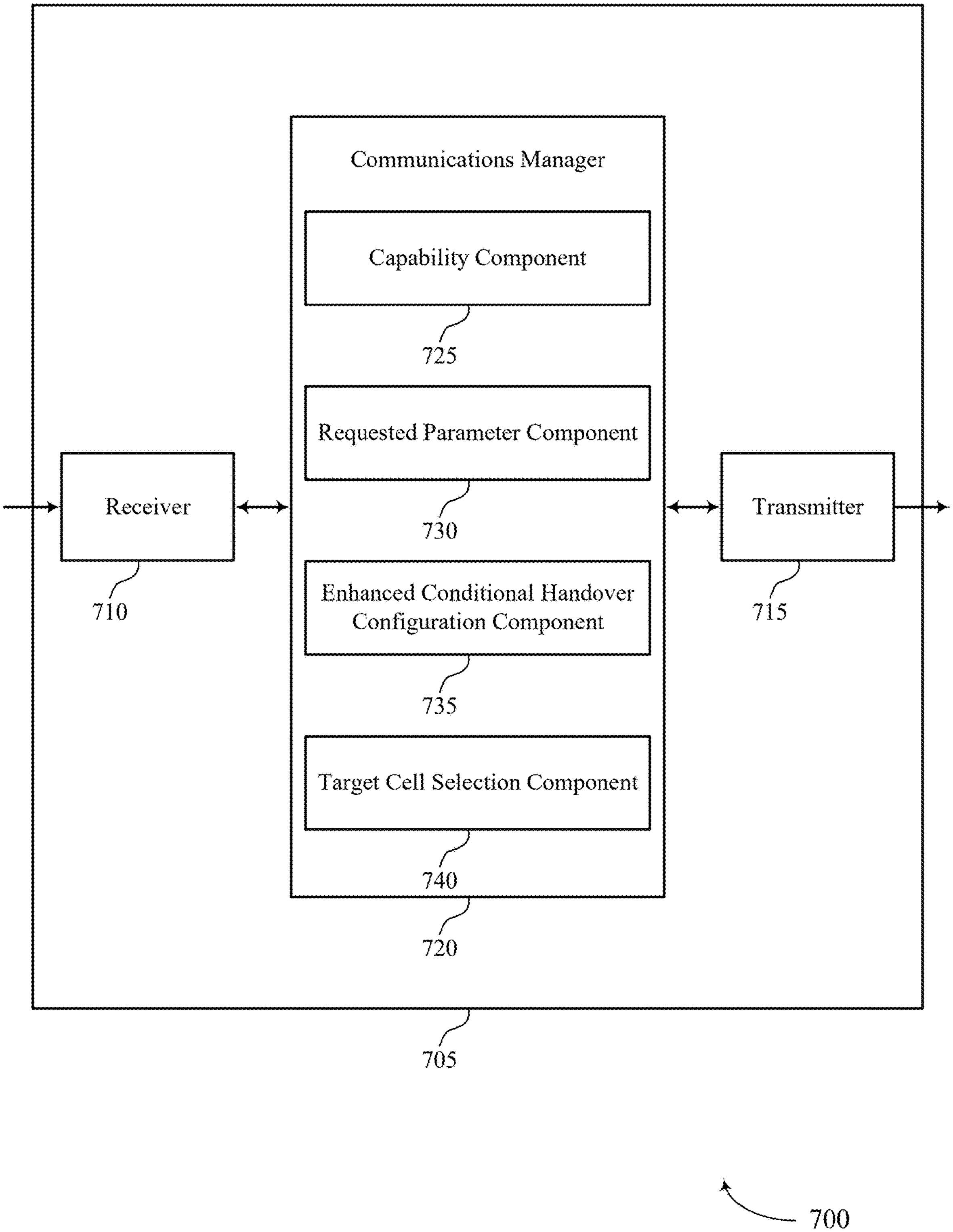

FIG. 7 shows a block diagram 700 of a device 705 that supports early data forwarding conditional handover configurations in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to early data forwarding conditional handover configurations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to early data forwarding conditional handover configurations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of early data forwarding conditional handover configurations as described herein. For example, the communications manager 720 may include a capability component 725, a requested parameter component 730, an enhanced conditional handover configuration component 735, a target cell selection component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The capability component 725 is capable of, configured to, or operable to support a means for transmitting a capability message indicative of a capability of the UE to perform a target cell selection based on an early data forwarding indication. The requested parameter component 730 is capable of, configured to, or operable to support a means for transmitting a message requesting one or more parameters associated with the conditional handover procedure, the one or more parameters including a handover type, whether conditional handover involves a RACH procedure, an early data forwarding status, a NES status, a NES mode, or any combination thereof. The enhanced conditional handover configuration component 735 is capable of, configured to, or operable to support a means for receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The target cell selection component 740 is capable of, configured to, or operable to support a means for performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE.

Figure 8:
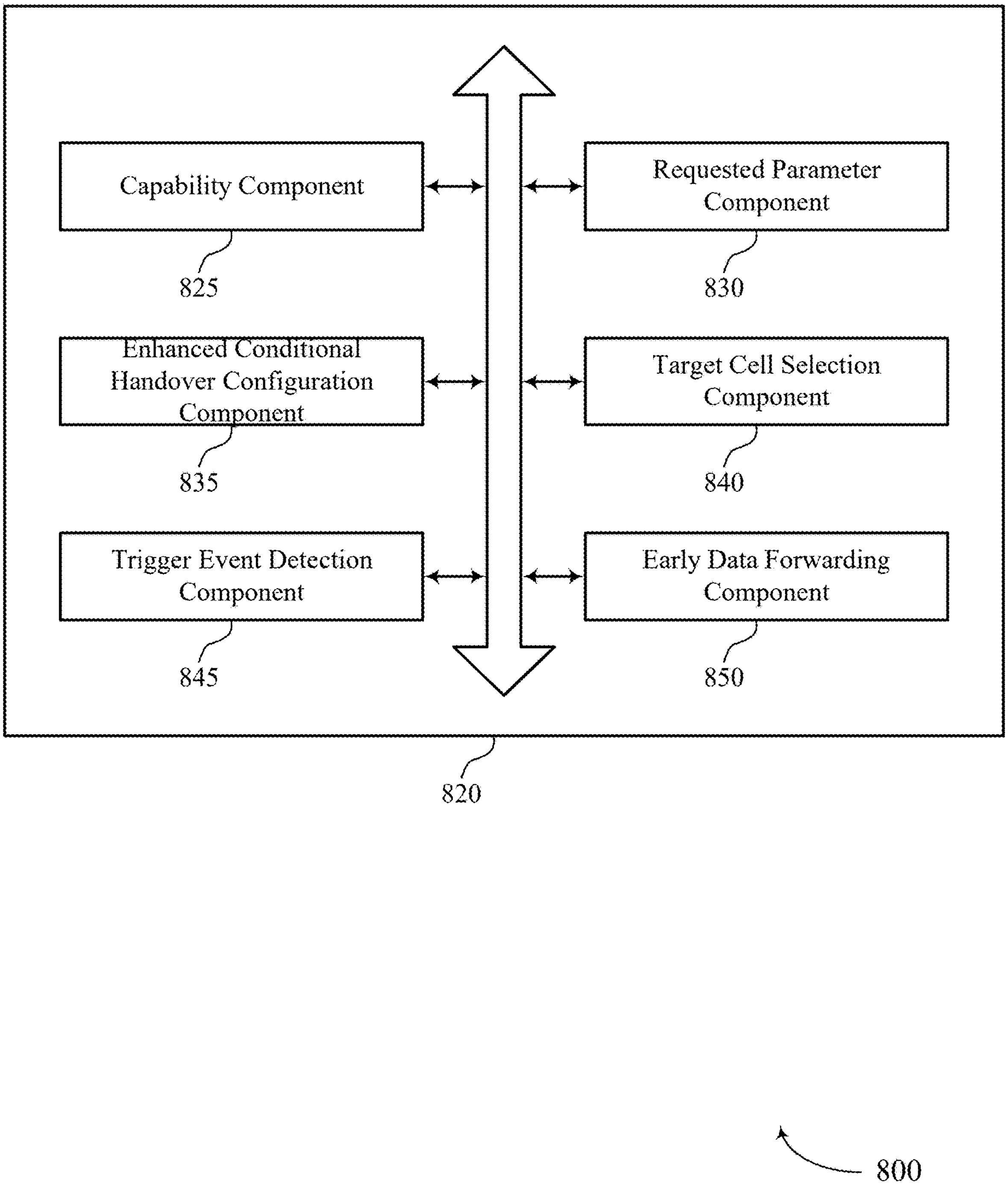
FIG. 8 shows a block diagram of a communications manager that supports early data forwarding conditional handover configurations in accordance with one or more aspects of the present disclosure.

FIG. 8 shows a block diagram 800 of a communications manager 820 that supports early data forwarding conditional handover configurations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of early data forwarding conditional handover configurations as described herein. For example, the communications manager 820 may include a capability component 825, a requested parameter component 830, an enhanced conditional handover configuration component 835, a target cell selection component 840, a trigger event detection component 845, an early data forwarding component 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The capability component 825 is capable of, configured to, or operable to support a means for transmitting a capability message indicative of a capability of the UE to perform a target cell selection based on an early data forwarding indication. The requested parameter component 830 is capable of, configured to, or operable to support a means for transmitting a message requesting one or more parameters associated with the conditional handover procedure, the one or more parameters including a handover type, whether conditional handover involves a RACH procedure, an early data forwarding status, a NES status, a NES mode, or any combination thereof. The enhanced conditional handover configuration component 835 is capable of, configured to, or operable to support a means for receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The target cell selection component 840 is capable of, configured to, or operable to support a means for performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE.

In some examples, the trigger event detection component 845 is capable of, configured to, or operable to support a means for detecting satisfaction of a set of multiple trigger conditions associated with the conditional handover procedure, each trigger condition of the set of multiple trigger conditions corresponding to a respective candidate cell of a set of multiple candidate cells of the enhanced conditional handover configuration. In some examples, the target cell selection component 840 is capable of, configured to, or operable to support a means for selecting, in response to detecting the satisfaction of the set of multiple trigger conditions, the target cell from the set of multiple candidate cells based on whether the early data forwarding to the target cell prior to the completion of the conditional handover procedure is supported, priority levels of the set of multiple candidate cells, radio frequency conditions, intra-node handover, inter-node handover, intra-DU handover, inter-DU handover, intra-CU handover, inter-CU handover, or any combination thereof with or without the early data forwarding, or any combination thereof.

In some examples, the one or more parameters further include the predicted traffic burst time interval, a predicted traffic burst volume, or both. In some examples, the NES status is based on the QoS threshold of the application.

In some examples, to support performing the conditional handover procedure, the early data forwarding component 850 is capable of, configured to, or operable to support a means for receiving, during the conditional handover procedure, one or more downlink messages.

In some examples, the requested parameter component 830 is capable of, configured to, or operable to support a means for transmitting one or more messages requesting support of the early data forwarding prior to the completion of the conditional handover procedure for one or more second candidate cells, a network energy savings mode, or both, where the enhanced conditional handover configuration is based on the one or more messages.

In some examples, the one or more candidate cells for which the early data forwarding to the target cell prior to the completion of the conditional handover procedure is supported are associated with a higher priority level than one or more second candidate cells of the enhanced conditional handover configuration.

In some examples, the enhanced conditional handover configuration further includes an indication of a time window during which the early data forwarding is performed for the one or more candidate cells.

In some examples, the enhanced conditional handover configuration further includes the NES mode of DTX, DRX, or both, a spatial adaptation, a power adaptation, or any combination thereof at one or more second cells.

In some examples, the enhanced conditional handover configuration includes an RRC reconfiguration.

In some examples, the enhanced conditional handover configuration is applicable to one or more different handover types, whether conditional handover involves a RACH procedure, early data forwarding statuses, NES modes, or any combination thereof.

In some examples, the enhanced conditional handover configuration further includes an indication of intra-node handover, inter-node handover, intra-DU handover, inter-DU handover, intra-CU handover, inter-CU handover, or any combination thereof with or without the early data forwarding.

Figure 9:
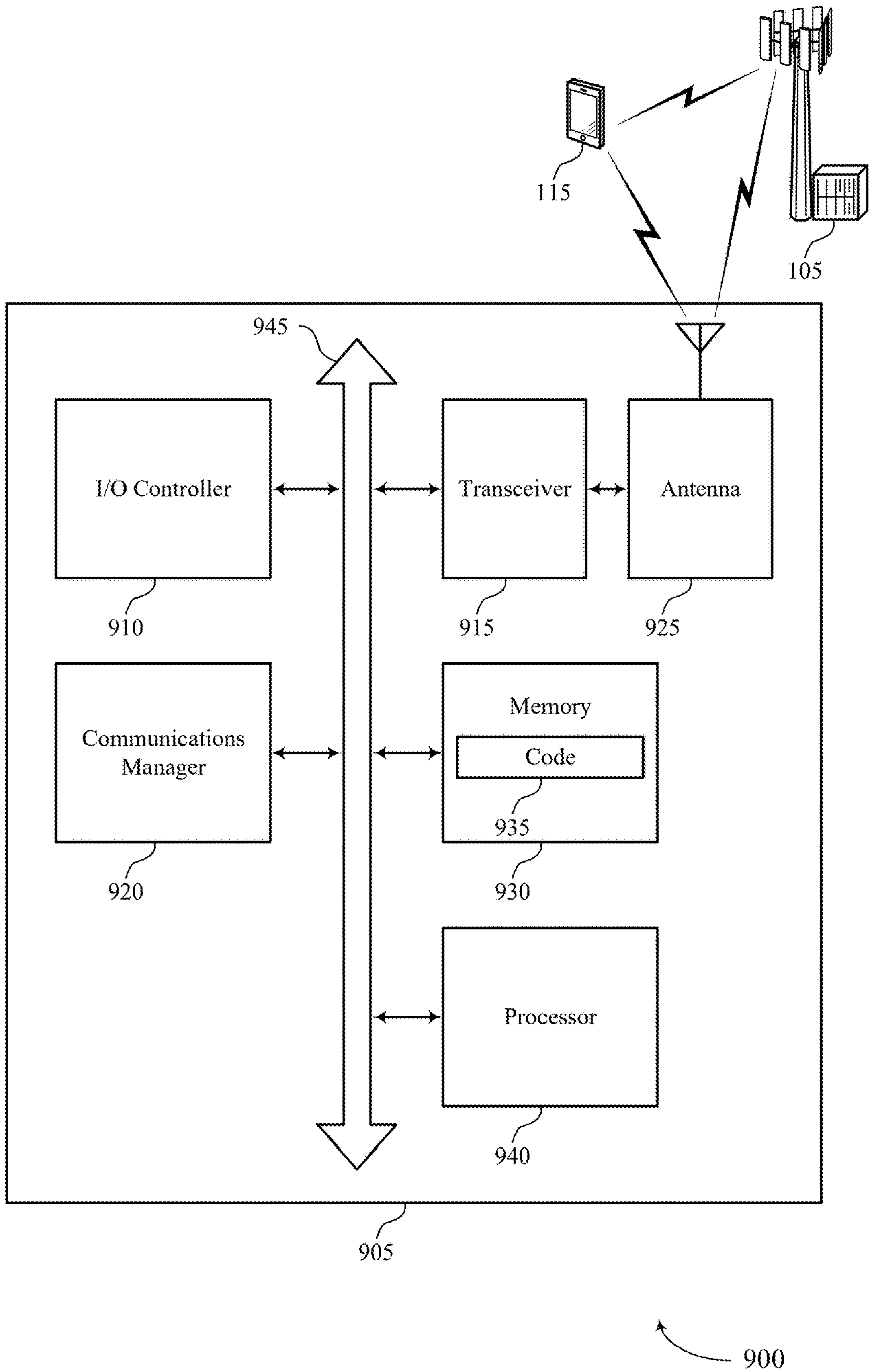
FIG. 9 shows a diagram of a system including a device that supports early data forwarding conditional handover configurations in accordance with one or more aspects of the present disclosure.

FIG. 9 shows a diagram of a system 900 including a device 905 that supports early data forwarding conditional handover configurations in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting early data forwarding conditional handover configurations). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for transmitting a capability message indicative of a capability of the UE to perform a target cell selection based on an early data forwarding indication. The communications manager 920 is capable of, configured to, or operable to support a means for transmitting a message requesting one or more parameters associated with the conditional handover procedure, the one or more parameters including a handover type, a whether conditional handover involves a RACH procedure, an early data forwarding status, a NES status, a NES mode, or any combination thereof. The communications manager 920 is capable of, configured to, or operable to support a means for receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The communications manager 920 is capable of, configured to, or operable to support a means for performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of early data forwarding conditional handover configurations as described herein, or the at least one processor 940 and the at least one memory 930 may be otherwise configured to, individually or collectively, perform or support such operations.

Figure 10:
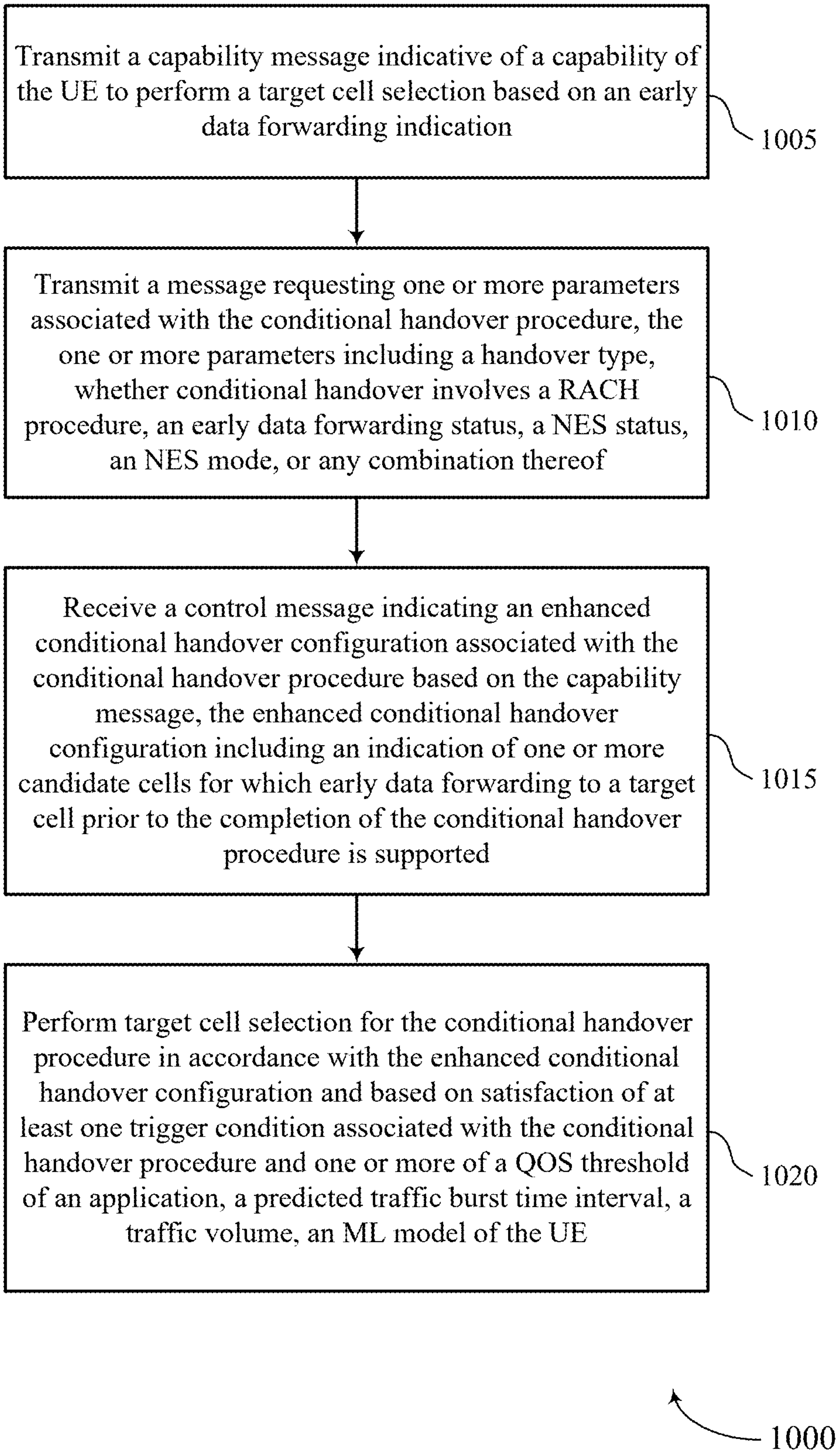
FIGS. 10 and 11 show flowcharts illustrating methods that support early data forwarding conditional handover configurations in accordance with one or more aspects of the present disclosure.

FIG. 10 shows a flowchart illustrating a method 1000 that supports early data forwarding conditional handover configurations in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include transmitting a capability message indicative of a capability of the UE to perform a target cell selection based on an early data forwarding indication. The operations of 1005 may be performed in accordance with examples as disclosed herein, such as the capability message 305 of FIG. 3 or the capability message at 505 of FIG. 5. In some examples, aspects of the operations of 1005 may be performed by a capability component 825 as described with reference to FIG. 8.

At 1010, the method may include transmitting a message requesting one or more parameters associated with the conditional handover procedure, the one or more parameters including a handover type, whether conditional handover involves a RACH procedure, an early data forwarding status, a NES status, a NES mode, or any combination thereof. The operations of 1010 may be performed in accordance with examples as disclosed herein, such as the requested handover parameters 310 message of FIG. 3 or the requested parameters at 510 of FIG. 5. In some examples, aspects of the operations of 1010 may be performed by a requested parameter component 830 as described with reference to FIG. 8.

At 1015, the method may include receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The operations of 1015 may be performed in accordance with examples as disclosed herein, such as the conditional handover configuration 315 of FIG. 3 or the control message at 515 of FIG. 5. In some examples, aspects of the operations of 1015 may be performed by an enhanced conditional handover configuration component 835 as described with reference to FIG. 8.

At 1020, the method may include performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE. The operations of 1020 may be performed in accordance with examples as disclosed herein, such as the target cell selection described with reference to FIG. 3 and at 525 of FIG. 5. In some examples, aspects of the operations of 1020 may be performed by a target cell selection component 840 as described with reference to FIG. 8.

Figure 11:
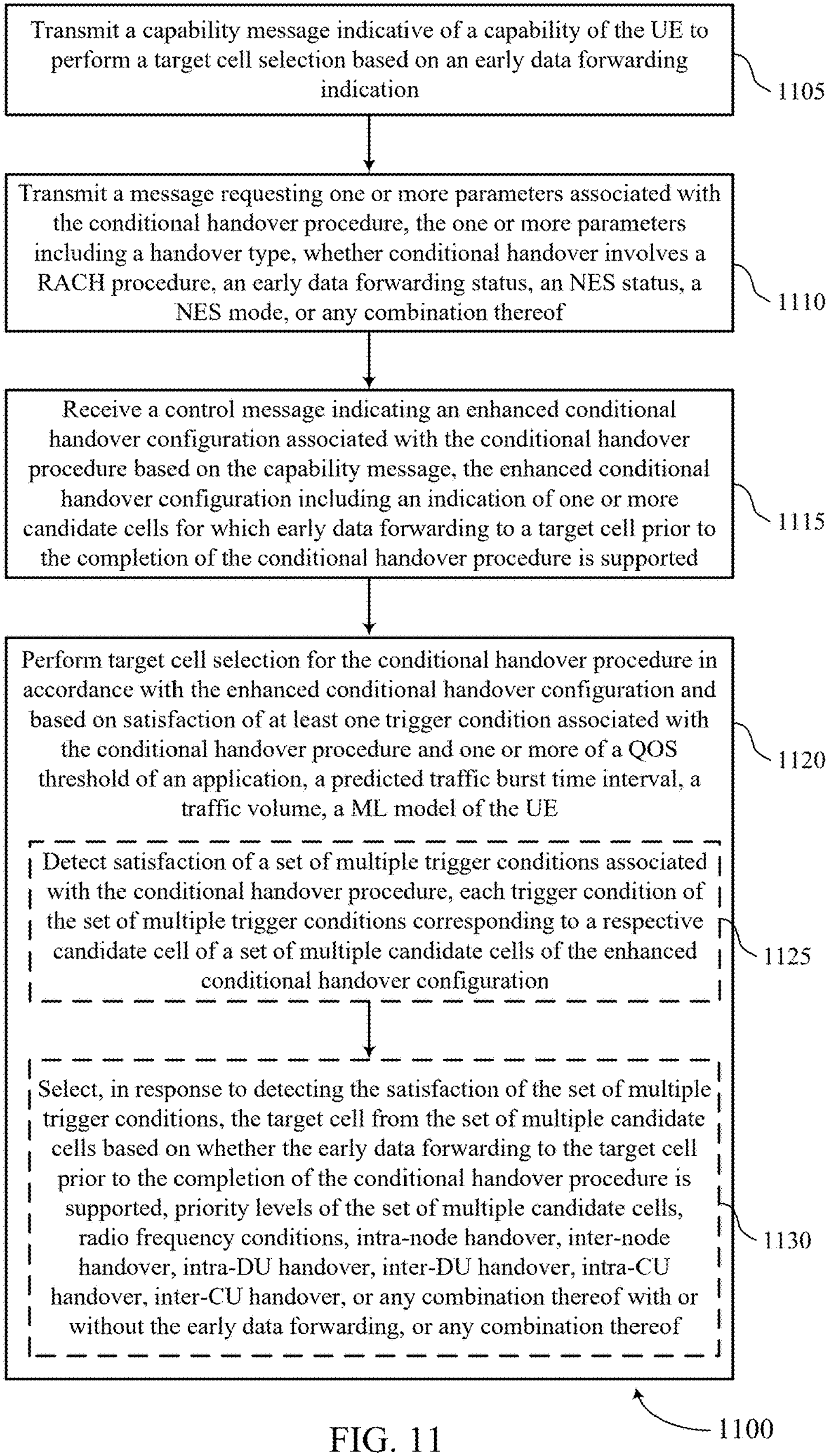

FIG. 11 shows a flowchart illustrating a method 1100 that supports early data forwarding conditional handover configurations in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include transmitting a capability message indicative of a capability of the UE to perform a target cell selection based on an early data forwarding indication. The operations of 1105 may be performed in accordance with examples as disclosed herein such as the capability message 305 of FIG. 3 or the capability message at 505 of FIG. 5. In some examples, aspects of the operations of 1105 may be performed by a capability component 825 as described with reference to FIG. 8.

At 1110, the method may include transmitting a message requesting one or more parameters associated with the conditional handover procedure, the one or more parameters including a handover type, whether conditional handover involves a RACH procedure, an early data forwarding status, a NES status, a NES mode, or any combination thereof. The operations of 1110 may be performed in accordance with examples as disclosed herein, such as the requested handover parameters 310 message of FIG. 3 or the requested parameters at 510 of FIG. 5. In some examples, aspects of the operations of 1110 may be performed by a requested parameter component 830 as described with reference to FIG. 8.

At 1115, the method may include receiving a control message indicating an enhanced conditional handover configuration associated with the conditional handover procedure based on the capability message, the enhanced conditional handover configuration including an indication of one or more candidate cells for which early data forwarding to a target cell prior to the completion of the conditional handover procedure is supported. The operations of 1115 may be performed in accordance with examples as disclosed herein, such as the conditional handover configuration 315 of FIG. 3 or the control message at 515 of FIG. 5. In some examples, aspects of the operations of 1115 may be performed by an enhanced conditional handover configuration component 835 as described with reference to FIG. 8.

At 1120, the method may include performing target cell selection for the conditional handover procedure in accordance with the enhanced conditional handover configuration and based on satisfaction of at least one trigger condition associated with the conditional handover procedure and one or more of a QoS threshold of an application, a predicted traffic burst time interval, a traffic volume, a ML model of the UE. The operations of 1120 may be performed in accordance with examples as disclosed herein, such as the target cell selection described with reference to FIG. 3 and at 525 of FIG. 5. In some examples, aspects of the operations of 1120 may be performed by a target cell selection component 840 as described with reference to FIG. 8.

Performing the target cell selection may include, at 1125, detecting satisfaction of a set of multiple trigger conditions associated with the conditional handover procedure, each trigger condition of the set of multiple trigger conditions corresponding to a respective candidate cell of a set of multiple candidate cells of the enhanced conditional handover configuration. The operations of 1125 may be performed in accordance with examples as disclosed herein. In some examples, aspects of the operations of 1125 may be performed by a trigger event detection component 845 as described with reference to FIG. 8.

Additionally, performing the target cell selection may include, 1130, selecting, in response to detecting the satisfaction of the set of multiple trigger conditions, the target cell from the set of multiple candidate cells based on whether the early data forwarding to the target cell prior to the completion of the conditional handover procedure is supported, priority levels of the set of multiple candidate cells, radio frequency conditions, intra-node handover, inter-node handover, intra-DU handover, inter-DU handover, intra-CU handover, inter-CU handover, or any combination thereof with or without the early data forwarding, or any combination thereof. The operations of 1130 may be performed in accordance with examples as disclosed herein. In some examples, aspects of the operations of 1130 may be performed by a target cell selection component 840 as described with reference to FIG. 8.

The following provides an overview of aspects of the present disclosure:

Aspect 1: A method for wireless communications by a UE, comprising: transmitting a capability message indicative of a capability of the UE to perform a target cell selection prior to completion of a conditional handover procedure based at least in part on an early data forwarding indication; transmitting a message requesting one or more parameters associated with the conditional handover procedure, the one or more parameters comprising a handover type, whether conditional handover involves a RACH procedure, an early data forwarding status, a NES status, a NES mode, or any combination thereof; receiving a control message indicating an enhanced conditional handover configuration associated with the conditional handover procedure based at least in part on the capability message, the enhanced conditional handover configuration comprising an indication of one or more candidate cells for which early data forwarding to a target cell prior to the completion of the conditional handover procedure is supported; and performing target cell selection for the conditional handover procedure in accordance with the enhanced conditional handover configuration and based at least in part on satisfaction of at least one trigger condition associated with the conditional handover procedure and one or more of a QoS threshold of an application, a predicted traffic burst time interval, a traffic volume, a ML model of the UE.

Aspect 2: The method of aspect 1, further comprising: detecting satisfaction of a plurality of trigger conditions associated with the conditional handover procedure, each trigger condition of the plurality of trigger conditions corresponding to a respective candidate cell of a plurality of candidate cells of the enhanced conditional handover configuration; and selecting, in response to detecting the satisfaction of the plurality of trigger conditions, the target cell from the plurality of candidate cells based at least in part on whether the early data forwarding to the target cell prior to the completion of the conditional handover procedure is supported, priority levels of the plurality of candidate cells, radio frequency conditions, intra-node handover, inter-node handover, intra-DU handover, inter-DU handover, intra-CU handover, inter-CU handover, or any combination thereof with or without the early data forwarding, or any combination thereof.

Aspect 3: The method of any of aspects 1 through 2, wherein the one or more parameters further comprise the predicted traffic burst time interval, a predicted traffic burst volume, or both, and the NES status is based at least in part on the QoS threshold of the application.

Aspect 4: The method of any of aspects 1 through 3, wherein the one or more candidate cells for which the early data forwarding is supported comprise the target cell, and wherein performing the conditional handover procedure comprises: receiving, during the conditional handover procedure, one or more downlink messages.

Aspect 5: The method of any of aspects 1 through 4, further comprising: transmitting one or more messages requesting support of the early data forwarding prior to the completion of the conditional handover procedure for one or more second candidate cells, a network energy savings mode, or both, wherein the enhanced conditional handover configuration is based at least in part on the one or more messages.

Aspect 6: The method of any of aspects 1 through 5, wherein the one or more candidate cells for which the early data forwarding to the target cell prior to the completion of the conditional handover procedure is supported are associated with a higher priority level than one or more second candidate cells of the enhanced conditional handover configuration.

Aspect 7: The method of any of aspects 1 through 6, wherein the enhanced conditional handover configuration further comprises an indication of a time window during which the early data forwarding is performed for the one or more candidate cells.

Aspect 8: The method of any of aspects 1 through 7, wherein the enhanced conditional handover configuration further comprises the NES mode of cell DTX, cell DRX, or both, a spatial adaptation, a power adaptation, or any combination thereof at one or more second cells.

Aspect 9: The method of any of aspects 1 through 8, wherein the enhanced conditional handover configuration comprises an RRC reconfiguration.

Aspect 10: The method of any of aspects 1 through 9, wherein the enhanced conditional handover configuration is applicable to one or more different handover types, whether the conditional handover involves the RACH procedure, early data forwarding statuses, NES modes, or any combination thereof.

Aspect 11: The method of any of aspects 1 through 10, wherein the enhanced conditional handover configuration further comprises an indication of intra-node handover, inter-node handover, intra-DU handover, inter-DU handover, intra-CU handover, inter-CU handover, or any combination thereof with or without the early data forwarding.

Aspect 12: A UE for wireless communications, comprising one or more memories storing processor-executable code, and one or more processors coupled with the one or more memories and individually or collectively operable to execute the code to cause the UE to perform a method of any of aspects 1 through 11.

Aspect 13: A UE for wireless communications, comprising at least one means for performing a method of any of aspects 1 through 11.

Aspect 14: A non-transitory computer-readable medium storing code for wireless communications, the code comprising instructions executable by one or more processors to perform a method of any of aspects 1 through 11.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit a capability message indicative of a capability of the UE to perform a target cell selection based at least in part on an early data forwarding indication;

transmit a message requesting one or more parameters associated with a conditional handover procedure, the one or more parameters comprising a handover type, whether conditional handover involves a random access channel (RACH) procedure, an early data forwarding status, a network energy saving (NES) status, a NES mode, or any combination thereof;

receive a control message indicating an enhanced conditional handover configuration associated with the conditional handover procedure based at least in part on the capability message, the enhanced conditional handover configuration comprising an indication of one or more candidate cells for which early data forwarding to a target cell prior to a completion of the conditional handover procedure is supported; and perform the target cell selection for the conditional handover procedure in accordance with the enhanced conditional handover configuration and based at least in part on satisfaction of at least one trigger condition associated with the conditional handover procedure and one or more of a Quality of Service (QoS) threshold of an application, a predicted traffic burst time interval, a traffic volume, and a machine learning (ML) model of the UE.

2. The UE of claim 1, wherein the one or more processors are individually or collectively further operable to execute the code to cause the UE to:

detect satisfaction of a plurality of trigger conditions associated with the conditional handover procedure, each trigger condition of the plurality of trigger conditions corresponding to a respective candidate cell of a plurality of candidate cells of the enhanced conditional handover configuration; and select, in response to detecting the satisfaction of the plurality of trigger conditions, the target cell from the plurality of candidate cells based at least in part on whether the early data forwarding to the target cell prior to the completion of the conditional handover procedure is supported, priority levels of the plurality of candidate cells, radio frequency conditions, intra-node entity handover, inter-node entity handover, intra-distributed unit (DU) handover, inter-DU handover, intra-centralized unit (CU) handover, inter-CU handover, or any combination thereof with or without the early data forwarding, or any combination thereof.

3. The UE of claim 1, wherein:

the one or more parameters further comprise the predicted traffic burst time interval, a predicted traffic burst volume, or both, and the NES status is based at least in part on the QoS threshold of the application.

4. The UE of claim 1, wherein, to perform the conditional handover procedure, the one or more processors are individually or collectively operable to execute the code to cause the UE to:

receive, during the conditional handover procedure, one or more downlink messages.

5. The UE of claim 1, wherein the one or more processors are individually or collectively further operable to execute the code to cause the UE to:

transmit one or more messages requesting support of the early data forwarding prior to the completion of the conditional handover procedure for one or more second candidate cells, a network energy savings mode, or both, wherein the enhanced conditional handover configuration is based at least in part on the one or more messages.

6. The UE of claim 1, wherein the one or more candidate cells for which the early data forwarding to the target cell prior to the completion of the conditional handover procedure is supported are associated with a higher priority level than one or more second candidate cells of the enhanced conditional handover configuration.

7. The UE of claim 1, wherein the enhanced conditional handover configuration further comprises an indication of a time window during which the early data forwarding is performed for the one or more candidate cells.

8. The UE of claim 1, wherein the enhanced conditional handover configuration further comprises the NES mode of cell discontinuous transmission (DTX), cell discontinuous reception (DRX), or both, a spatial adaptation, a power adaptation, or any combination thereof at one or more second cells.

9. The UE of claim 1, wherein the enhanced conditional handover configuration comprises a radio resource control (RRC) reconfiguration.

10. The UE of claim 1, wherein the enhanced conditional handover configuration is applicable to one or more different handover types, whether the conditional handover involves the RACH procedure, early data forwarding statuses, NES modes, or any combination thereof.

11. The UE of claim 1, wherein the enhanced conditional handover configuration further comprises an indication of intra-node handover, inter-node handover, intra-distributed unit (DU) handover, inter-DU handover, intra-centralized unit (CU) handover, inter-CU handover, or any combination thereof with or without the early data forwarding.

12. A method for wireless communications by a user equipment (UE), comprising:

transmitting a capability message indicative of a capability of the UE to perform a target cell selection based at least in part on an early data forwarding indication;

transmitting a message requesting one or more parameters associated with a conditional handover procedure, the one or more parameters comprising a handover type, whether conditional handover involves a random access channel (RACH) procedure, an early data forwarding status, a network energy saving (NES) status, a NES mode, or any combination thereof;

receiving a control message indicating an enhanced conditional handover configuration associated with the conditional handover procedure based at least in part on the capability message, the enhanced conditional handover configuration comprising an indication of one or more candidate cells for which early data forwarding to a target cell prior to a completion of the conditional handover procedure is supported; and performing the target cell selection for the conditional handover procedure in accordance with the enhanced conditional handover configuration and based at least in part on satisfaction of at least one trigger condition associated with the conditional handover procedure and one or more of a Quality of Service (QoS) threshold of an application, a predicted traffic burst time interval, a traffic volume, a machine learning (ML) model of the UE.

13. The method of claim 12, further comprising:

detecting satisfaction of a plurality of trigger conditions associated with the conditional handover procedure, each trigger condition of the plurality of trigger conditions corresponding to a respective candidate cell of a plurality of candidate cells of the enhanced conditional handover configuration; and selecting, in response to detecting the satisfaction of the plurality of trigger conditions, the target cell from the plurality of candidate cells based at least in part on whether the early data forwarding to the target cell prior to the completion of the conditional handover procedure is supported, priority levels of the plurality of candidate cells, radio frequency conditions, intra-node handover, inter-node handover, intra-distributed unit (DU) handover, inter-DU handover, intra-centralized unit (CU) handover, inter-CU handover, or any combination thereof with or without the early data forwarding, or any combination thereof.

14. The method of claim 12, wherein:

the one or more parameters further comprise the predicted traffic burst time interval, a predicted traffic burst volume, or both, and the NES status is based at least in part on the QoS threshold of the application.

15. The method of claim 12, wherein the one or more candidate cells for which the early data forwarding is supported comprise the target cell, and wherein performing the conditional handover procedure comprises:

receiving, during the conditional handover procedure, one or more downlink messages.

16. The method of claim 12, further comprising:

transmitting one or more messages requesting support of the early data forwarding prior to the completion of the conditional handover procedure for one or more second candidate cells, a network energy savings mode, or both, wherein the enhanced conditional handover configuration is based at least in part on the one or more messages.

17. The method of claim 12, wherein the one or more candidate cells for which the early data forwarding to the target cell prior to the completion of the conditional handover procedure is supported are associated with a higher priority level than one or more second candidate cells of the enhanced conditional handover configuration.

18. The method of claim 12, wherein the enhanced conditional handover configuration further comprises an indication of a time window during which the early data forwarding is performed for the one or more candidate cells.

19. The method of claim 12, wherein the enhanced conditional handover configuration further comprises the NES mode of cell discontinuous transmission (DTX), cell discontinuous reception (DRX), or both, a spatial adaptation, a power adaptation, or any combination thereof at one or more second cells.

20. A non-transitory computer-readable medium storing code for wireless communications, the code comprising instructions executable by one or more processors to:

transmit a capability message indicative of a capability of a user equipment (UE) to perform a target cell selection based at least in part on an early data forwarding indication;

transmit a message requesting one or more parameters associated with a conditional handover procedure, the one or more parameters comprising a handover type, whether conditional handover involves a random access channel (RACH) procedure, an early data forwarding status, a network energy saving (NES) status, a NES mode, or any combination thereof;

receive a control message indicating an enhanced conditional handover configuration associated with the conditional handover procedure based at least in part on the capability message, the enhanced conditional handover configuration comprising an indication of one or more candidate cells for which early data forwarding to a target cell prior to a completion of the conditional handover procedure is supported; and perform the target cell selection for the conditional handover procedure in accordance with the enhanced conditional handover configuration and based at least in part on satisfaction of at least one trigger condition associated with the conditional handover procedure and one or more of a Quality of Service (QoS) threshold of an application, a predicted traffic burst time interval, a traffic volume, a machine learning (ML) model of the UE.

* * * * *